United States Patent [19]
Cooper

[11] 3,885,416
[45] May 27, 1975

[54] DILATOMETER APPARATUS

[75] Inventor: Paul G. Cooper, Johnstown, Ohio

[73] Assignee: Harrop Precision Furnace, Columbus, Ohio

[22] Filed: Aug. 13, 1973

[21] Appl. No.: 387,924

[52] U.S. Cl. .................................................. 73/16
[51] Int. Cl. .......................................... G01h 25/16
[58] Field of Search .......................... 73/16, 15 DTA

[56] References Cited
UNITED STATES PATENTS

| | | | |
|---|---|---|---|
| 1,766,775 | 6/1930 | Chevenard | 73/16 |
| 2,559,789 | 7/1951 | Peckham | 73/16 |
| 2,580,259 | 12/1951 | Wetherbee | 73/16 |
| 3,106,086 | 10/1963 | Hughel | 73/16 |
| 3,303,689 | 2/1967 | Paulin et al. | 73/15 |
| 3,474,658 | 10/1969 | Levy et al. | 73/16 |

*Primary Examiner*—Herbert Goldstein
*Attorney, Agent, or Firm*—Cennamo; Kremblas; Foster

[57] ABSTRACT

A dilatometer which comprises an improved support construction and arrangement of the probe measuring rods in conjunction with an improved measuring system for detecting the desired dimensional changes of the sample to be measured to afford the recording of absolute sample measurements. The probe rods which transfer the dimensional changes in the sample to the measuring system are uniquely supported independently from one another to provide a much simpler and more stable support construction. The measuring system is adapted in accordance therewith to automatically cancel all dimensional changes except the sample dilation.

2 Claims, 3 Drawing Figures

DILATOMETER APPARATUS

BACKGROUND

Previous dilatometry apparatus including those presently used commercially have been less than satisfactory due to error introduced by internal movement, material variations and mechanical instability or by the necessity to complete the sample dilation by an independent and subsequent step.

The most prevalent prior art dilatometers which have for many years been commercially used are known as the "push rod type." In one form, this type of apparatus consists of a support construction to which a measuring device is attached to sense or measure the movement of the probe rod which rest on the sample. The whole support mechanism is constructed to "float." That is, the support mechanism is rigidly connected to a plurality of compensating probe rods which are free to expand or contract and move the support structure accordingly.

The theoretical result therefore is that the change of length of the probe rod resting on the sample is cancelled by the corresponding change of length in the compensating probe rods supporting the overhead structure carrying the measuring device. Therefore the measuring device senses only the sample dilation.

The primary problem with this arrangement is that thermal gradients within the furnace and the mechanical instability inherent in such a construction, all too frequently introduce error in the measurement of the sample dilation.

Another type of apparatus measures the total movement of the sample and the probe resting on the sample. The sample dilation must then be calculated via a previous measurement of a known sample and a calculation of the contribution from the probe material. This error determination is then used in an independent and distinct step to compute the unknown sample dilation. Other than the obvious time consuming drawback to this type of apparatus, it also is subject to the reliability of the furnace apparatus to reproduce the same temperature conditions for both the known sample run and for the unknown sample run.

SUMMARY

The present invention relates generally to systems for accurately measuring thermal changes in materials and specifically to an improved dilatometer.

The improvement consists primarily in providing a stable overhead support structure for the measuring apparatus and the relationship of that support structure with the probe rods resting on the sample or samples and a compensating probe.

In conjunction with the improved support system, an improved readout of the sample dilation is accomplished by an appropriate electrical readout apparatus which in cooperation with the improved overstructure accurately detects and records only the change in length of the sample. Any errors that may be caused by movement above or below the sample are automatically cancelled, leaving only the change in the sample which is recorded.

OBJECTS

It is therefore a primary object of the present invention to provide an improved dilatometer construction which is not subject to the common sources of error associated with many prior art devices and therefore renders more accurate and precise sample measurements but which also provides an absolute measurement of the sample dilation without additional calculation.

It is another object of the present invention to provide an apparatus of the type described wherein the construction of the readout devices and the overhead support structure permits relatively simple construction of a dilatometer capable of simultaneous measurements of a plurality of samples in a convenient manner.

It is another object of the present invention to provide an apparatus of the type described which virtually eliminates error caused by mechanical instability of the support structure carrying the readout apparatus.

It is still another object of the present invention to provide an apparatus of the type described which incorporates the above mentioned advantages and yet is still of relatively simple and inexpensive construction as compared to prior devices of relatively comparable accuracy.

Further objects and advantages of the present invention will be apparent from the following description, reference being had to the accompanying drawings wherein a preferred form of embodiment of the invention is clearly shown.

IN THE DRAWINGS

DETAILED DESCRIPTION

Figure 1:
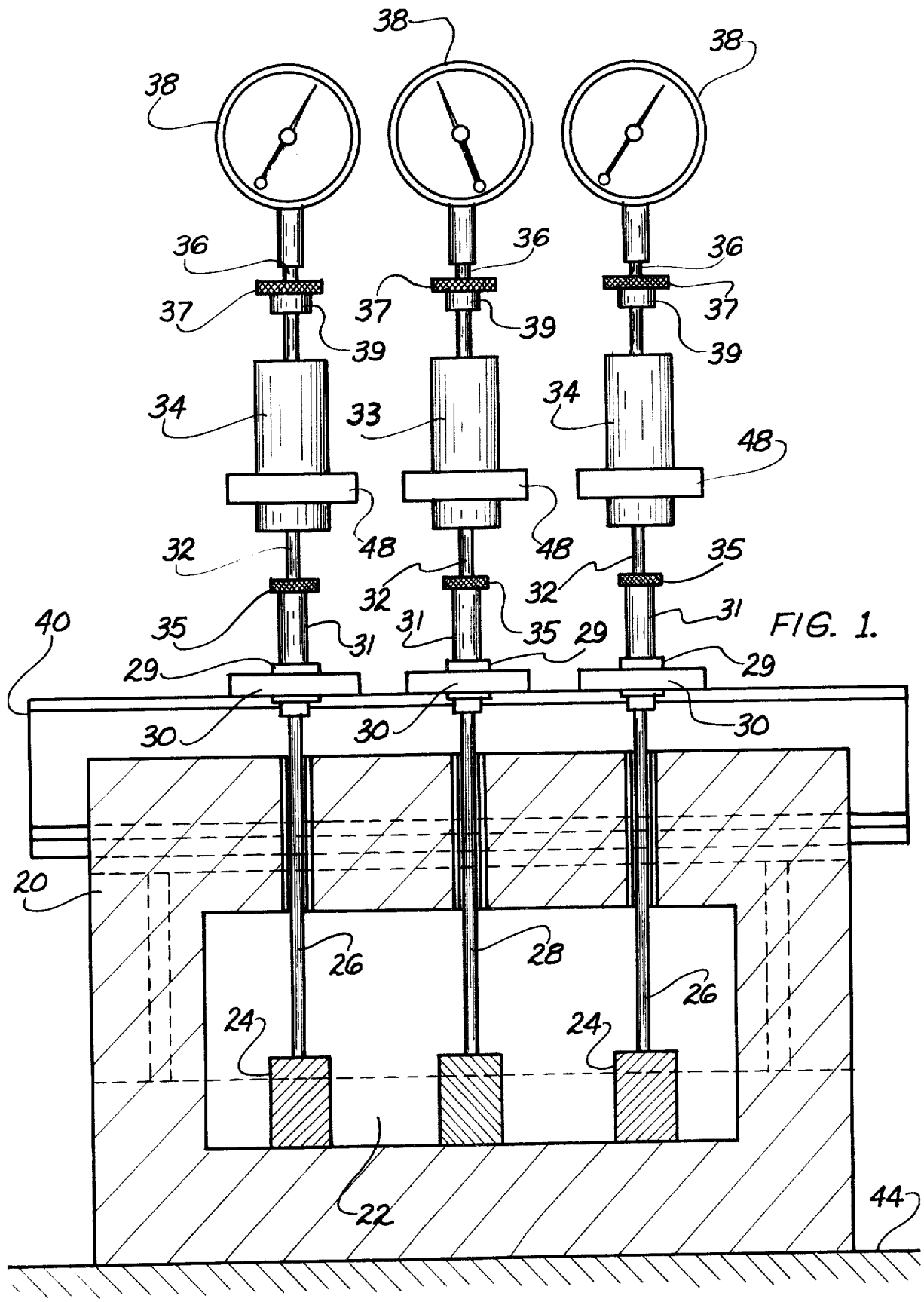
FIG. 1 is a front elevational view, partially in section, of a dilatometer apparatus constructed in accordance with the present invention.

An improved dilatometer constructed in accordance with the present invention is illustrated in FIG. 1 and includes a conventional furnace 20 of the type having conventional temperature control means, not shown, for varying the temperature in furnace chamber 22.

In the embodiment shown, a pair of samples 24 rest on the base of chamber 22. It should be pointed out that the present invention is applicable to one sample as well as uniquely adapted to a plurality of samples for simultaneous measurement in a relatively simple manner as compared to prior art construction.

A probe rod, preferably made of a ceramic material, rests upon each unknown sample 24 and extends upwardly through the top wall of furnace 20.

Similarly, a compensator probe rod 28 of the same material and dimensions as rods 26, rests upon the top of a known sample 27 and extends upwardly through the top wall if furnace 20. A known reference sample 27 preferably consists of a ceramic material having known thermal characteristics and is substantially of the same dimensions or mass as the unknown samples. This is desirable so that the thermal treatment of the unknown sample and the known sample are substantially the same to assure the precise cancelling of the known sample's expansion by the appropriate correction value later described herein.

Rods 26 and 28 extend upwardly through a journal bearing 29 provided in support member 30 and are fixed to a coupler 31. A respective contact member 32 is also threadably engaged to each coupler 31 of transducers 34 and transducer 33 in a manner that permits the probes to move freely in a vertical direction and for the contact member 32 to transmit the movement to each transducer.

Extensions 35 of contact members 32 also operatively engage the sensing member 36 of visual readout members 38 which indicate the total movement associated with rods 26 and 28.

The threaded engagement between member 32 and couplers 31 permit the contact members 32 to be easily calibrated and then fixed in place by tightening each nut 35 after proper positioning.

Similarly threaded members 37 fix the upper position of cap members 39 upon which sensing members 36 freely rest.

Figure 2:
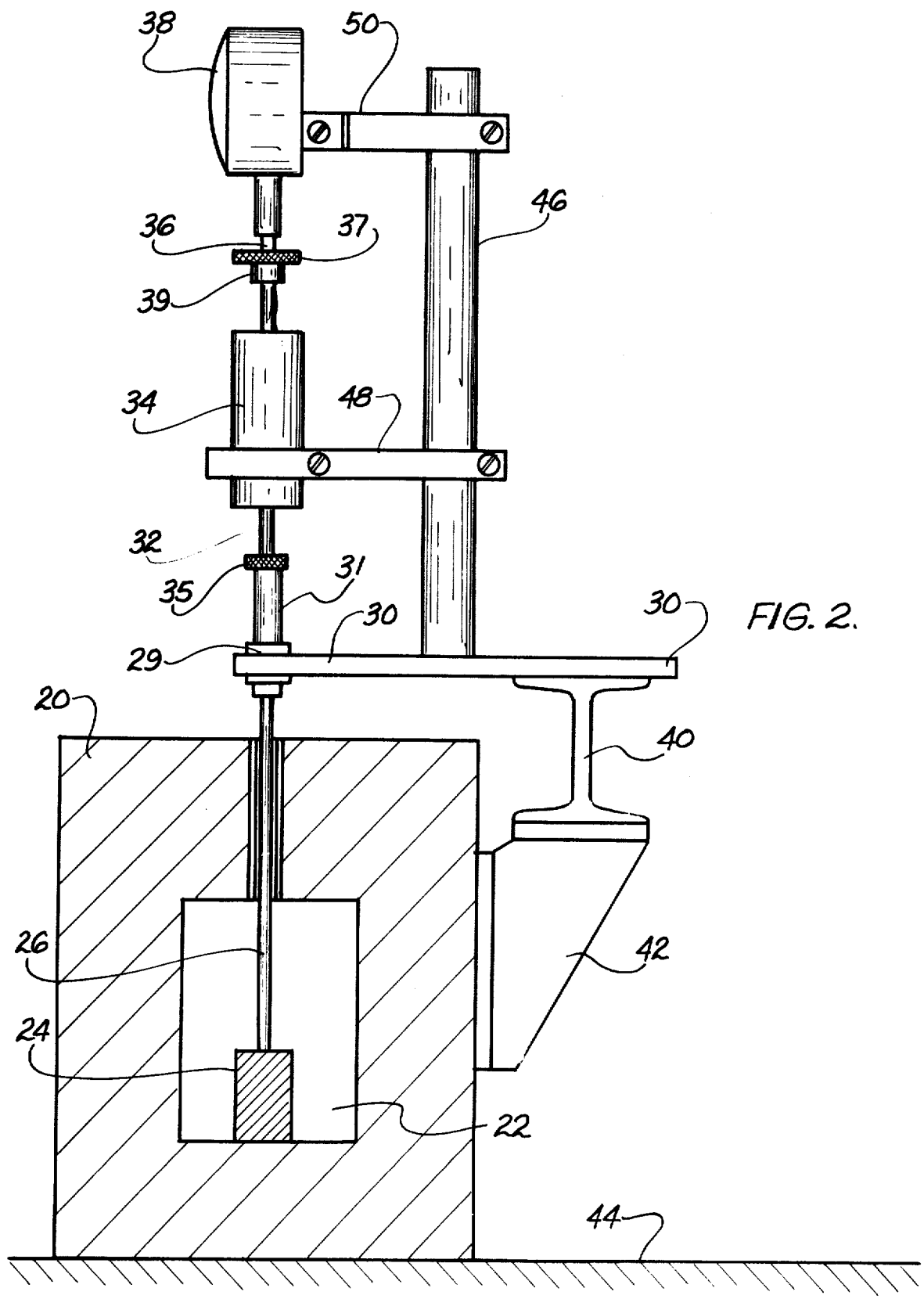
FIG. 2 is a side elevational view partially, in section, of the dilatometer shown in FIG. 1.

As best seen in FIG. 2, probe rod support members 30 are rigidly fixed to an I-beam support member 30, which in turn is rigidly connected to furnace 20.

A vertically disposed post member 46 is rigidly connected to each horizontal member 30 and includes lateral auxiliary support members 48 and 50 which are rigidly fixed to transducers 34 and 35 and visual dials 38 respectively.

From the foregoing description, it should be apparent that rods 26 and 28 are free to move vertically, however, the supporting overstructure which fixes the position of the transducers and the visual dials is stationary.

Therefore in the present invention, each rod 26 and 28 has its own sensing and measuring apparatus in a fixed position which senses the total movement observed. The support structure is rigid and therefore clearly very stable.

Unlike the prior art type of floating over-structure or other complex mechanical means, the present invention is not subject to errors related to this form of mechanical instability or unreliabilty.

A conventional electrical readout circuit may be adapted to the present invention to quite simply provide the absolute sample dilation. A typical D-C circuit is illustrated in block diagram form in FIG. 3.

Figure 3:
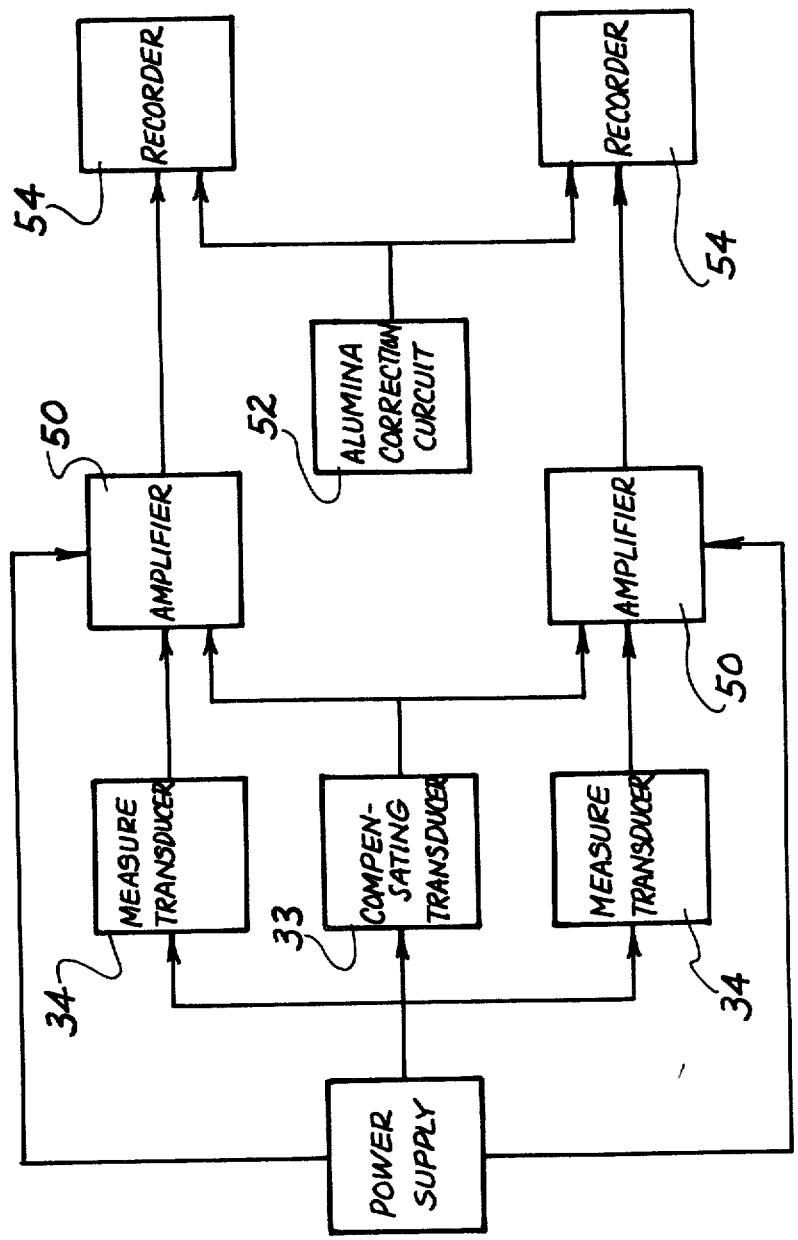
FIG. 3 is a diagrammatic view of a typical measuring system used in the present invention.

Referring to FIG. 3, the signal from a respective transducer 34 which senses the dilation of the respective samples 24 and probe rods 26 is fed to a pair of conventional amplifiers 50. The signal from transducer 33 is connected such that it is of opposite polarity relative to the signals from the transducers 34 and is also operatively connected to amplifiers 50. Therefore the signal emanating from transducer 35 representing the dilation of compensator probe 28 is effectively substracted from the signal from transducer 34. A further correction is introduced through the compensator correction circuit 52 which represents a correction for the known dilation of the known sample 27 which is in effect substracted from the signal from transducer 33. This preferably is in the form of a thermocouple arrangement which will effectively produce the same voltage signals at a respective temperature which coincide with the known dilation curve of the reference sample 27.

The signals from the respective amplifiers 50 and the appropriate correction from correction circuit 52 are fed to a respective conventional recorder means 54. Since the signal from each transducer 34 has been corrected by in effect, substracting the signal from the compensating transducer 33 representing the change in length only of compensator probe 28, the recorders 52 record only the change in length of the respective samples 24.

It should be pointed out that in the present invention, the effective measurement of sample dilation is substantially free from any error caused by any movement above or below the sample due to the unique arrangement of the sensing means and the means of correcting for the dimensional changes which take place in the rods 26 and 28. This includes minimizing errors due to thermal gradients within furnace chamber 22. This is particularly true as compared to the prior art floating overhead structure approach which depended upon equal dilation of at least three compensating support probes.

Further, in the present invention, any error introduced because of the failure to reproduce the same thermal gradients in separate runs as is necessary in other prior systems is eliminated.

It should be readily apparent from the foregoing description that the present invention provides a greatly improved system wherein accuracy is enhanced and time is saved in obtaining the desired results.

What is claimed is:

1. A dilatometer apparatus comprising, in combination, a furnace including a furnace chamber adapted to removably receive a plurality of test samples disposed on the base of said chamber; a plurality of sample probes of predetermined known dimensions vertically disposed within said chamber each including a lower end adapted to freely rest on the top of a respective one of said test samples and an upper end extending through the upper wall of said furnace; a compensating probe of the same material and substantially the same dimensions as said sample probe vertically disposed within said chamber and including a lower end resting on the top of a reference sample which rests on the base of said chamber and an upper end extending through the top wall of said furnace; a plurality of first transducing means fixedly mounted above the upper wall of said furnace and each operatively engaging a respective one of said sample probes for sensing and converting the relative vertical movement of each of said probes to an electrical signal; a second transducing means fixedly mounted above the upper wall of said furnace and operatively engaging said compensating probe for sensing and converting the relative vertical movement of said probe and said reference sample to an electrical signal; and measuring circuit means operatively connected to said first and second transducing means to effectively substract that portion of the signal associated with said compensating probe representing the dilation of the probe from each of the signals associated with each of said sample probes and including recording means to visually record only the portion of the signal representing the vertical dilation of the sample.

2. The apparatus defined in claim 1 wherein the signal from the second transducing means associated with the compensating probe is of opposite polarity relative to the signal produced by the first transducing means associated with the sample probe and wherein said measuring circuit means includes a correction circuit to account for the portion of the signal produced by the dilation of the reference sample and effectively sums said signals to obtain a signal representing only the change of length of each of the test samples.

* * * * *